US011263414B2

(12) United States Patent
Fedtke

(10) Patent No.: US 11,263,414 B2
(45) Date of Patent: Mar. 1, 2022

(54) BIDIRECTIONAL DATA EXCHANGE ACROSS DEVICES VIA BARCODES

(71) Applicant: Stephen U. Fedtke, Zug (CH)

(72) Inventor: Stephen U. Fedtke, Zug (CH)

( * ) Notice: Subject to any disclaimer, the term of this patent is extended or adjusted under 35 U.S.C. 154(b) by 0 days.

(21) Appl. No.: 16/942,252

(22) Filed: Jul. 29, 2020

(65) Prior Publication Data

US 2022/0036022 A1 Feb. 3, 2022

(51) Int. Cl.
*G06K 7/14* (2006.01)
(52) U.S. Cl.
CPC ......... *G06K 7/1417* (2013.01); *G06K 7/1447* (2013.01); *G06K 7/1486* (2013.01); *G06K 7/1495* (2013.01)
(58) Field of Classification Search
CPC .. G06K 7/1417; G06K 7/1486; G06K 7/1495; G06K 7/1447
See application file for complete search history.

(56) References Cited

U.S. PATENT DOCUMENTS

2006/0071077 A1* 4/2006 Suomela .......... G06K 19/06112
235/462.01
2017/0104592 A1* 4/2017 Merdinger ............... G09C 5/00

* cited by examiner

*Primary Examiner* — Matthew Mikels
(74) *Attorney, Agent, or Firm* — Womble Bond Dickinson (US) LLP

(57) ABSTRACT

According to one embodiment, data is exchanged between two devices where the transmitting device displays a barcode (e.g., a Quick Response "QR" code) and the receiving device captures the barcode with a camera. Each of the devices may alternate between being the transmitting device and the receiving device. Therefore, bidirectional exchange of data between the devices can be achieved. No electrical or radio connections, such as Bluetooth, Wi-Fi, cables, or the Internet, etc., are required between the devices for the transmission to take place.

20 Claims, 5 Drawing Sheets

BIDIRECTIONAL DATA EXCHANGE ACROSS DEVICES VIA BARCODES

FIELD OF THE INVENTION

Embodiments of the present invention relate generally to electronic devices. More particularly, embodiments of the invention relate to method and system to bidirectional data transfers based on barcodes.

BACKGROUND

A matrix (or two-dimensional "2D") barcode, or simply a matrix or a 2D code, such as a Quick Response (QR) code, is a two-dimensional way to represent information in a visual, machine-readable form. Conventionally, retrieving the information encoded in a 2D barcode is a one-way process: the 2D barcode is displayed on a screen, or is printed on a piece of paper or on an object, and is optically scanned with a scanner or captured with a camera. The scanned or captured 2D barcode is then decoded to retrieve the information.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
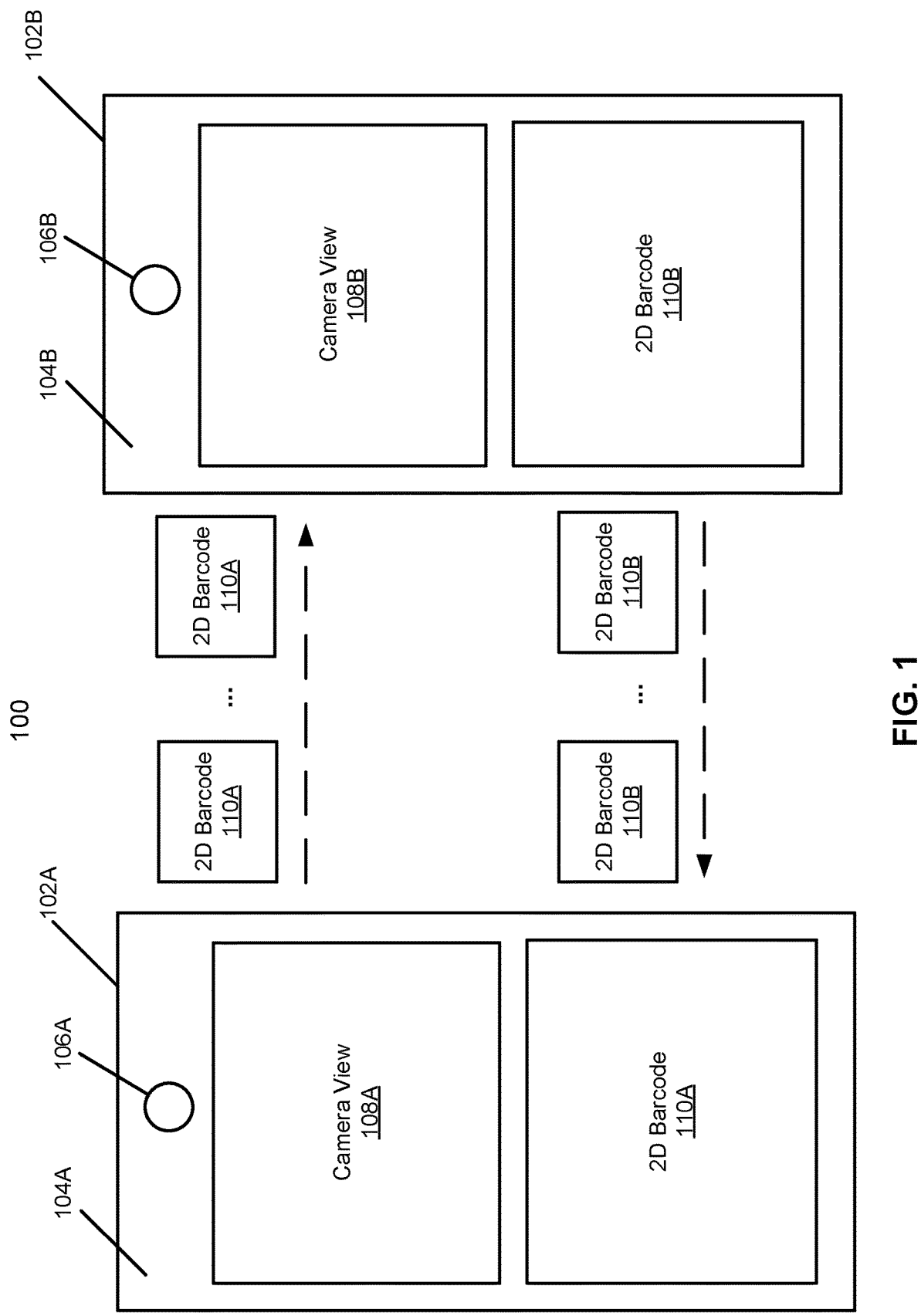
FIG. 1 is a block diagram illustrating an example environment according to one embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, data is exchanged between two devices where the transmitting device displays a 2D barcode (e.g., a Quick Response "QR" code) and the receiving device captures the 2D barcode with a camera. Each of the devices may alternate between being the transmitting device and the receiving device. Therefore, bidirectional exchange of data between the devices can be achieved. No electrical or radio connections, such as Bluetooth, Wi-Fi, cables, or the Internet, etc., are required between the devices for the bidirectional transmission to take place. In one embodiment, either of the devices may be a mobile device, such as a smartphone, a tablet, etc.

In one embodiment, both devices may be within each other's line of sight, and are positioned and oriented in such a manner that each device may capture with its camera the 2D barcode displayed on the other device in real time. For example, for devices that have a display and a camera on a same side of the device (i.e., the devices have "front-facing" cameras), the devices may be placed in a "face-to-face" arrangement relative to each other.

In one embodiment, payload data is divided into one or more data packages at a first device (e.g., a sender device). One or more payload 2D barcodes are generated at the first device, each payload 2D barcode corresponding to one of the one or more data packages and comprising data of the corresponding data package. Images are captured by a first camera of the first device, wherein a view of the first camera covers a second display of a second device, and any 2D barcode contained in the images captured by the first camera is detected and decoded at the first device to recover the data encoded therein. The one or more payload 2D barcodes are displayed at a first display of the first device in sequence, one at a time, until all the one or more payload 2D barcodes have been displayed, wherein the first device stops displaying a previous payload 2D barcode and proceeds to display a subsequent payload 2D barcode in response to detection in the images of the second display captured by the first camera an ACK 2D barcode corresponding to the previous payload 2D barcode.

From the perspective of the second device (e.g., a receiver device), images are captured by a second camera of the second device, wherein a view of the second camera covers the first display of the first device, and any 2D barcode contained in the images captured by the second camera is detected and decoded at the second device to recover the data encoded therein. The one or more payload 2D barcodes are captured and decoded at the second device in sequence, one at a time, until all the one or more payload 2D barcodes have been decoded, wherein the second device generates and displays a corresponding ACK 2D barcode in response to decoding each of the one or more payload 2D barcodes in the images of the first display captured by the second camera. A corresponding data package is stored at the second device upon decoding each of the one or more payload 2D barcodes. The payload data is recovered at the second device based on the stored data packages.

In one embodiment, the payload 2D barcodes and the ACK 2D barcodes comprise Quick Response (QR) codes. In one embodiment, each of the one or more payload 2D barcodes comprises a payload 2D barcode sequence number and a total quantity of the one or more payload 2D barcodes. In one embodiment, the first device, being in a sending role, performs deadlock resolution operations in response to detecting, while displaying a first of the one or more payload 2D barcodes, that the second device is also in a sending role. To resolve the deadlock, a countdown of a first random time period is started at the first device. The first device is kept in the sending role and the countdown is stopped when the first device detects that the second device has displayed an ACK 2D barcode corresponding to the first of the one or more payload 2D barcode before the countdown is finished. The first device is switched into a receiving role when the countdown is finished.

In one embodiment, the corresponding data package comprised in each of the one or more payload 2D barcodes is encrypted or compressed. In one embodiment, all data comprised in each of the one or more payload 2D barcodes is encrypted or compressed. In one embodiment, at least one of the one or more payload 2D barcodes further comprises one or more of: a size of the corresponding data package, a checksum, a sender device identifier (ID), a receiver device ID, or a data transfer session ID. In one embodiment, the second device refuses to partake in the data transfer when the sender device ID does not match any device ID on an allowed sender list.

In one embodiment, prior to displaying a first of the one or more payload 2D barcodes, the first device generates and displays an initiation 2D barcode comprising one or more of: a password, an encryption key, or a data transfer purpose. In one embodiment, prior to detecting, in images of the second display of the second device, an ACK 2D barcode corresponding to the first of the one more payload 2D barcodes, the first device adjusts display of the first of the one or more payload 2D barcodes on the first display. The adjusting comprises one or more of: 1) adjusting a display location of the 2D barcode on the first display, 2) rotating the displayed 2D barcode by a predetermined degree in a predetermined direction, or 3) temporarily disappearing the 2D barcode from display. In one embodiment, the first device and the second device are separated by transparent solid material. Note that a 2D barcode is utilized an example of a machine-readable code throughout this application. However, other types of machine-readable codes (e.g., three-dimensional (3D) or four dimensional (4D) codes) may also be applicable.

Referring to FIG. 1, a block diagram illustrating an example environment 100 according to one embodiment is shown. Two devices 102A, 102B are illustrated. The two devices 102A, 102B may be mobile devices, such as smartphones, or tablets, or other similar devices. Each of the devices 102A, 102B comprises a display 104A, 104B and a camera 106A, 106B on a same side of the device. The two devices 102A, 102B may be positioned and oriented relative to each other such that the display of one device is viewable by the camera of the other device, and vice versa. For example, the two devices 102A, 102B may be placed in a face-to-face position relative to each other, and may be mostly parallel to each other. It should be appreciated that rotating either of the devices does not normally disrupt the operation of the embodiments described herein, so long as the devices are still face-to-face relative to and mostly parallel to each other. Each of the devices 102A, 102B displays on the respective display 104A, 104B one or more 2D barcodes 110A, 110B, one at a time, such that the displayed 2D barcode 110A, 110B is captured by the camera 106B, 106A of the other device in real time. In one embodiment, each of the devices 102A, 102B may further display a camera view 108A, 108B on the display 104A, 104B to assist the user(s) with appropriately arranging the two devices 102A, 102B such that the displayed 2D barcodes 110A, 110B are properly captured by the camera 106B, 106A of the other device. Each of the devices 102A, 102B is capable of decoding the captured 2D barcodes 110B, 110A. As will be described in further detail herein, the displayed 2D barcodes 110A, 110B and the real-time capture and decoding of the displayed barcodes 110, 110B by the other device enable the two devices 102A, 102B to perform bidirectional data communication. Note that camera views 108A and 108B are optional. In most situations, camera views 108A and 108B may not be displayed as the display area of a mobile device is very limited. Each device may only display the code it generates, such that the opposing device can capture it using its own camera.

It should be appreciated that the two devices should be placed at an appropriate distance from each other to allow the cameras to properly focus on the 2D barcodes and to capture complete 2D barcodes in sufficient detail. Therefore, the distance between the two devices should neither be too close (lest the camera cannot properly focus, or the complete 2D barcode cannot be captured) nor too far (lest the 2D barcode cannot be captured in sufficient detail). In different embodiments, the distance between the two devices may be approximately 20-35 centimeters.

It should be appreciated that the bidirectional data transfer described herein can take place even when the two devices are separated by transparent solid material. For example, the data transfer can take place across a transparent window glass pane. In another embodiment, the data transfer techniques described herein may be utilized when the two devices are suitably arranged vis-à-vis one or more mirrors, as long as through reflection by the mirrors, the 2D barcode displayed on one device can be captured by the camera of the other device, and vice versa.

In different embodiments, depending on the actual application associated with the data exchange and whether the user(s)' manual input is desired, the data exchange between the two devices may be initiated in one of various fashions. It should be appreciated that with some applications including, for example, a file transfer application akin to FTP or Airdrop, one of the devices is mainly a sender, and the other device is mainly a receiver, while with some other applications, both devices send and receive substantial amounts of payload data to and from each other.

In one embodiment, one of the devices is the sender of payload data, and the other device is the receiver of payload data. Further, the roles of the two devices may be predetermined before the initiation of the data transfer. For example, with a file transfer application, the sender device and the receiver device have their roles predetermined and fixed, either automatically, or based on user inputs, before the initiation of the data transfer. In one example, a user may specify a file to transfer and place the sender device in the sender role through interaction with a user interface at the sender device, and may place the receiver device in the receiver role through interaction with a user interface at the receiver device.

Because a single 2D barcode can convey only a limited amount of information, the sender device may divide the payload data to be transmitted into one or more packages, each package to be transmitted with one 2D barcode. The sender device may then display a first of one or more payload 2D barcodes, and start looking for an acknowledgment (ACK) of receipt of the first 2D barcode in the form of an ACK 2D barcode captured by its camera. In one embodiment, the receiver device does not display any particular 2D barcode, or may display a blank code, before any payload 2D barcode is captured and decoded. When the sender device and the receiver device are properly arranged with respect to each other, the receiver device may capture the first payload 2D barcode with its camera, decode the first payload 2D barcode, and in response to successfully decoding the first payload 2D barcode, display a first ACK 2D barcode. The capture of the first ACK 2D barcode by the camera of the sender device and the successful decoding of the first ACK 2D barcode at the sender device indicate the successful transmission of the first payload 2D barcode ("package").

If more than one payload 2D barcodes are to be transmitted, the sender device may proceed to display subsequent payload 2D barcodes, one at a time, where a subsequent payload 2D barcode is displayed in response to a detection of an ACK 2D barcode displayed at the receiver device corresponding to the previous payload 2D barcode. On the other hand, the receiver device captures the series of payload 2D barcodes with its camera, one at a time, decodes the captured payload 2D barcodes upon detection, and stores the decoded data packages locally, where upon successful decoding of each payload 2D barcode and storage of the corresponding data package, the receiver device displays a corresponding ACK 2D barcode on its display, which is to be captured by the camera of the sender device, so that the sender device may proceed to the subsequent payload 2D barcode. When all the payload 2D barcodes have been transmitted in this way, the receiver device may recover the original payload data by combining the locally stored data packages.

Figure 2:
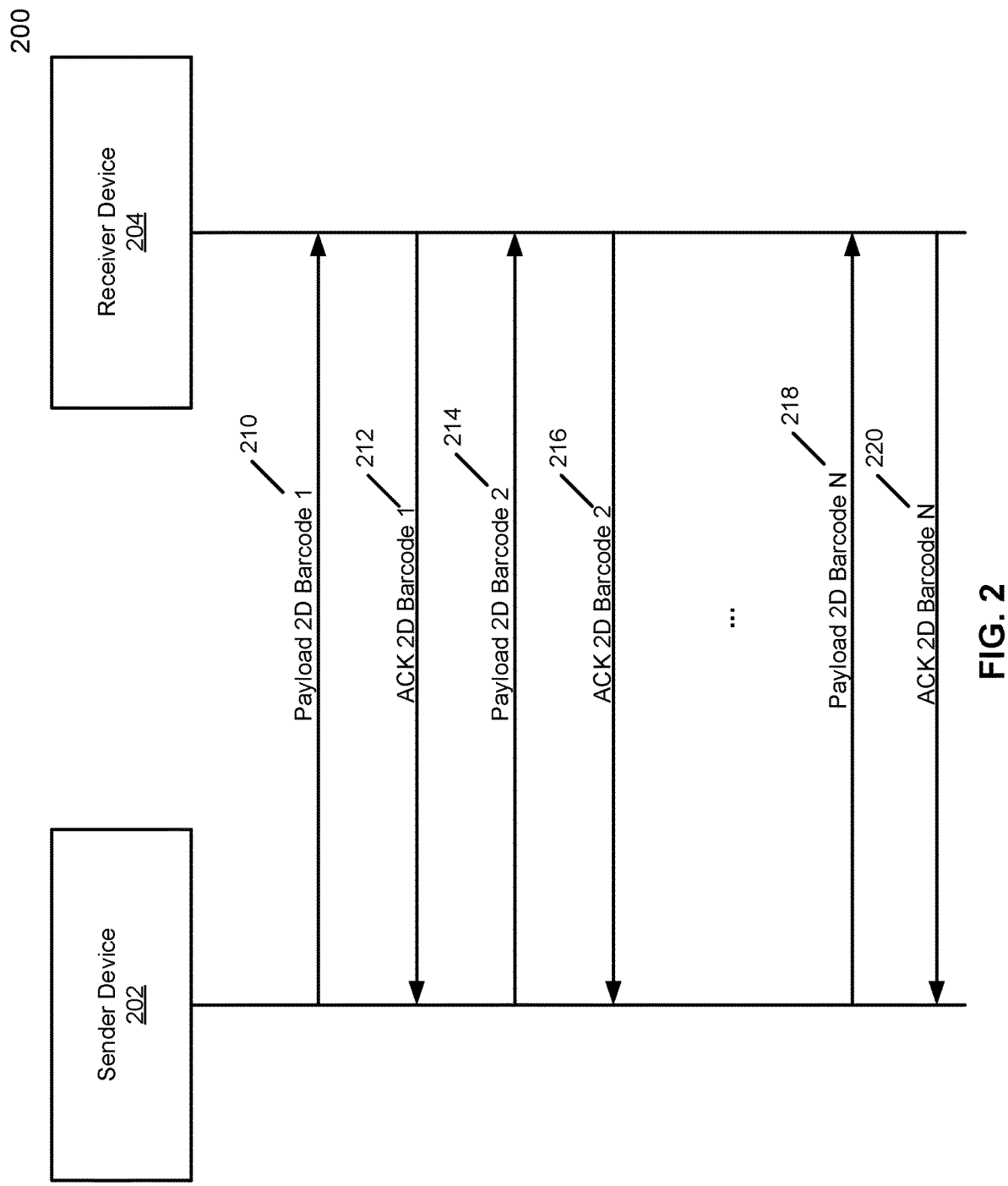
FIG. 2 is a diagram illustrating an example sequence of 2D barcodes displayed and captured during a data transfer.

Referring to FIG. 2, a diagram 200 illustrating an example sequence of 2D barcodes displayed and captured during a data transfer according to one embodiment is shown. The sender device 202 displays a first payload 2D barcode 210. Upon successful capture and decoding of the first payload 2D barcode 210, the receiver device 204 displays a first ACK 2D barcode 212. Upon detection of the first ACK 2D barcode 212, the sender device 202 proceeds to display a second payload 2D barcode 214. Upon successful capture and decoding of the second payload 2D barcode 214, the receiver device 204 displays a second ACK 2D barcode 216. The sequence proceeds with additional payload 2D barcodes in a similar fashion, until the sender device 202 displays a last payload 2D barcode 218. Upon successful capture and decoding of the last payload 2D barcode 218, the receiver device 204 displays a last ACK 2D barcode 220. The last ACK 2D barcode 220 indicates to the sender device 202 that the complete series of payload 2D barcodes have been transmitted to the receiver device 204. After decoding the last payload 2D barcode 218, the receiver device 204 may recover the original payload data based on the stored data packages transmitted with the series of payload 2D barcodes. Detecting the completeness of all packages can be detected since both devices know the current package sequence number, as well as the total package number.

Figure 3:
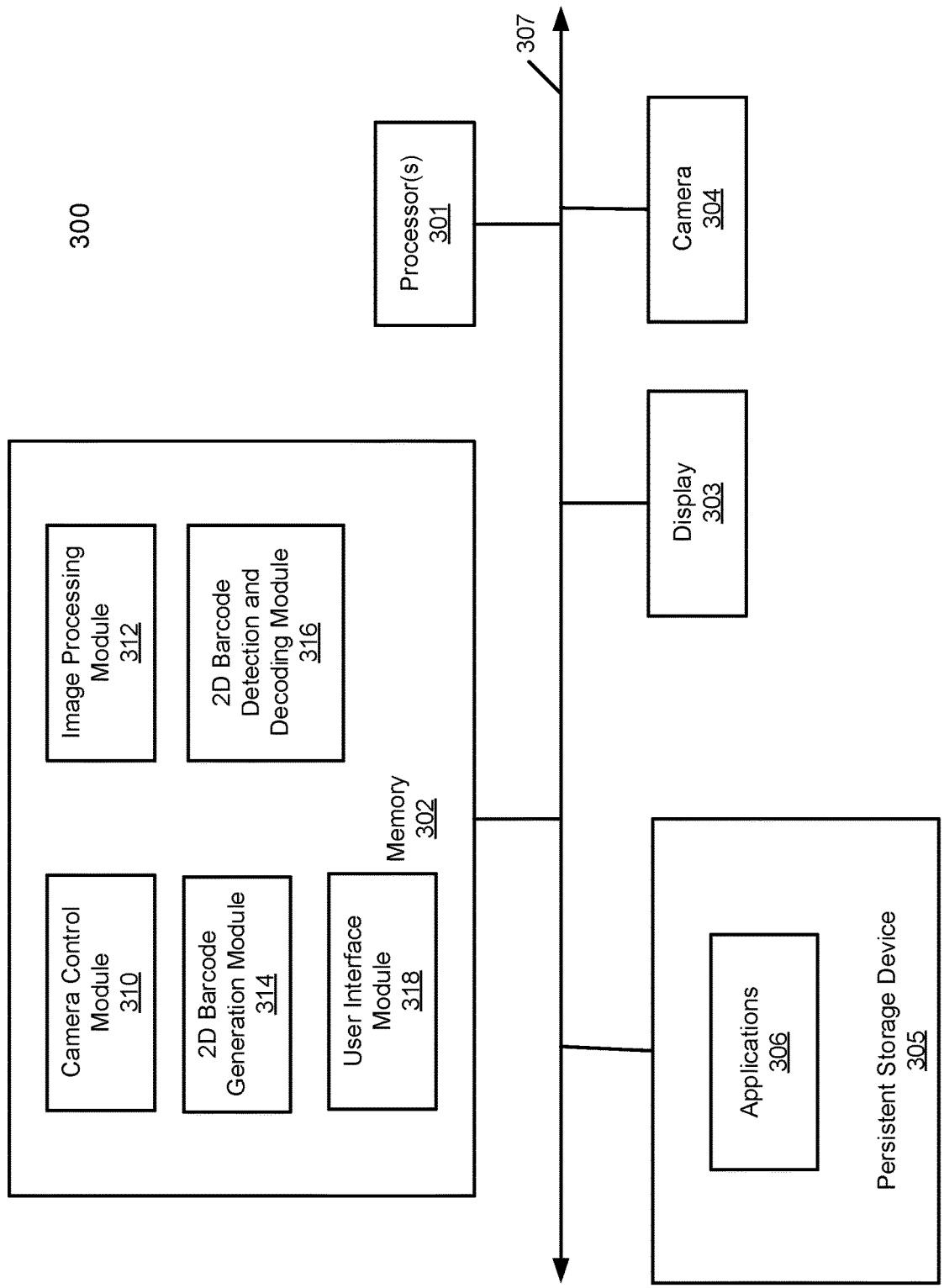
FIG. 3 is a block diagram illustrating an example of a device according to one embodiment.

FIG. 3 is a block diagram illustrating an example of a device 300 according to one embodiment. Mobile device 300 may represent devices 102A, 102B of FIG. 1 or devices 202, 204 of FIG. 2. Referring to FIG. 3, in this example, camera control module 310, image processing module 312, 2D barcode generation module 314, 2D barcode detection and decoding module 316, and user interface module 318 are loaded in memory 302 and executed by one or more processors 301. In one embodiment, 2D barcode generation module 314, 2D barcode detection and decoding module 316, and user interface module 318 may be part of an application that is stored as part of applications 306 in persistent storage device 305. Memory 302 can be any kind of volatile memory such as random access memory (RAM). Persistent storage device 305 can be any kind of non-volatile storage device such as hard disks. Processor(s) 301 can be any kind of processors, such as a central processing unit or CPU. The display 303 and the camera 304 can be any suitable kind of display and camera, respectively. These components are coupled to each other over an interconnect 307, which may be a bus or a point-to-point connection.

Under the control of the camera control module 310, the camera 304 may capture discrete or continuous images. The images captured may include images of a display of another similar device that is showing a 2D barcode. Functions performed by the camera control module 310 may include an autofocus function. The images captured at the camera 304 may be pre-processed by the image processing module for later storage or further processing, such as by 2D barcode detection and decoding module 316. 2D barcode generation module 314 encodes data to be included in a 2D barcode and generates a corresponding 2D barcode that includes the data according to the specification of the chosen 2D barcode format. The generated 2D barcode then may be displayed on the display 303. User interface module 318 enables the receipt of inputs including conventional touchscreen inputs, file inputs, motion inputs, or gesture inputs, etc., and the generation and provision of outputs including display (visual) outputs, sound outputs, voice outputs, or vibration outputs, etc.

Figure 4:
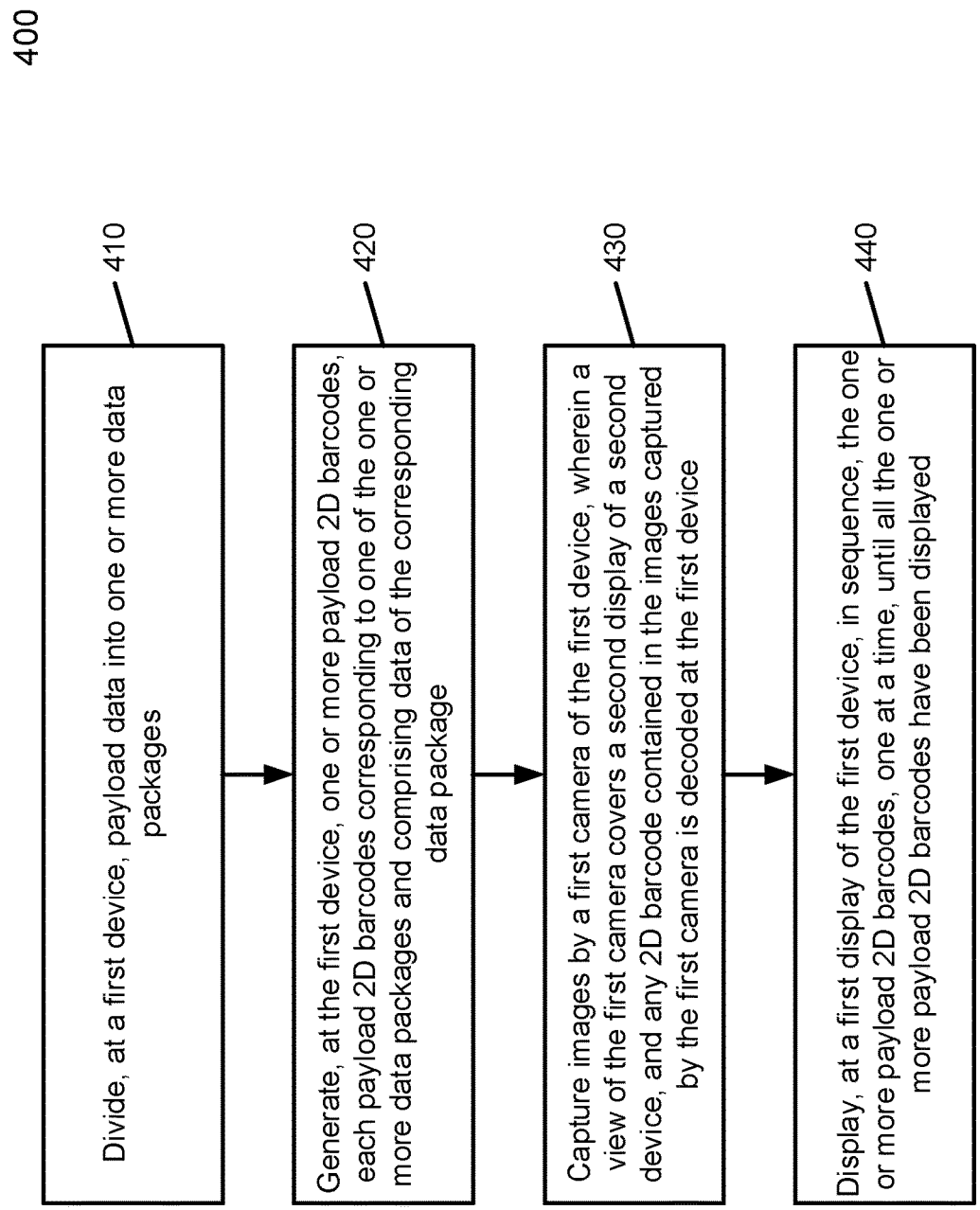
FIG. 4 is a block diagram illustrating an example method for transferring data with 2D barcodes according to one embodiment.

Referring to FIG. 4, a block diagram illustrating an example method 400 for transferring data with 2D barcodes according to one embodiment is shown. Process 400 may be performed by processing logic which may include software, hardware, or a combination thereof. For example, process 400 may be performed by device 300 of FIG. 3, which may correspond to sender device 202 of FIG. 2. At block 410, payload data is divided into one or more data packages at a first device. At block 420, one or more payload 2D barcodes are generated at the first device, each payload 2D barcode corresponding to one of the one or more data packages and comprising data of the corresponding data package. At block 430, images are captured by a first camera of the first device, wherein a view of the first camera covers a second display of a second device, and any 2D barcode contained in the images captured by the first camera is detected and decoded at the first device to recover the data encoded or embedded therein. At block 440, the one or more payload 2D barcodes are displayed at a first display of the first device in sequence, one at a time, until all the one or more payload 2D barcodes have been displayed, wherein the first device stops displaying a previous payload 2D barcode and proceeds to display a subsequent payload 2D barcode in response to detection in the images of the second display captured by the first camera an ACK 2D barcode corresponding to the previous payload 2D barcode.

Figure 5:
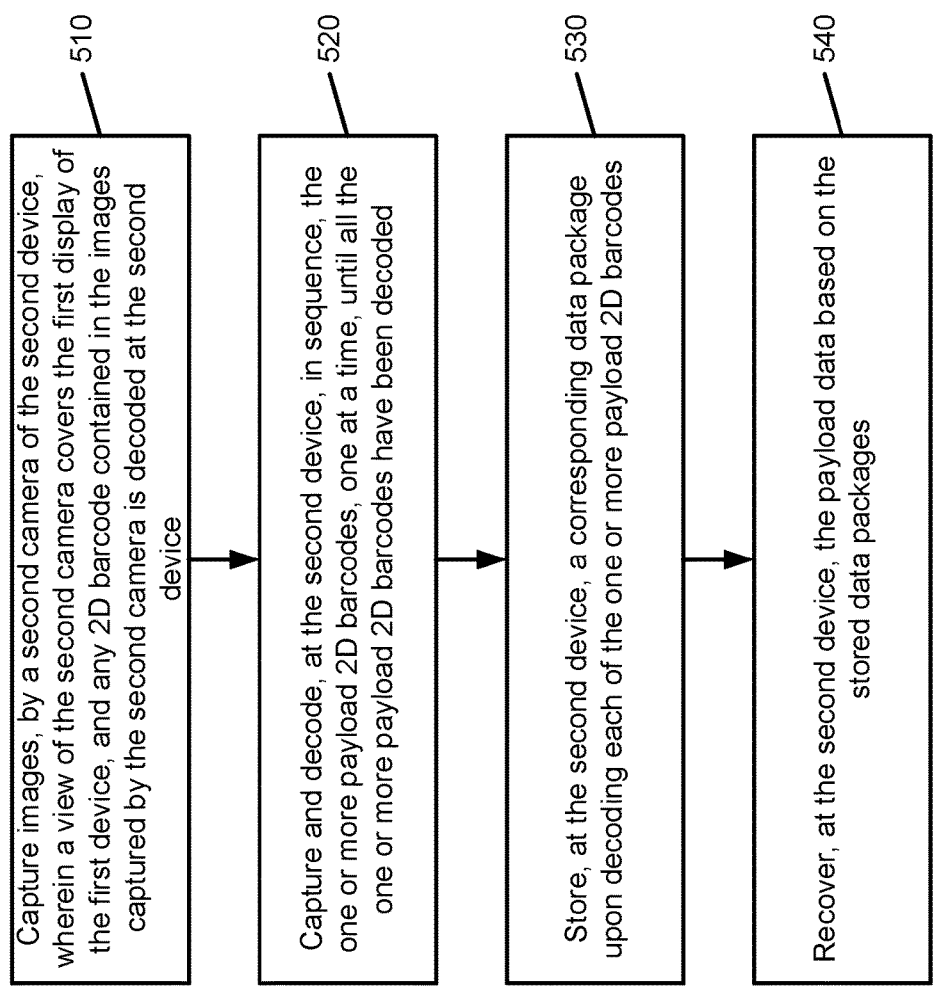
FIG. 5 is a block diagram illustrating an example method for transferring data with 2D barcodes according to one embodiment.

Referring to FIG. 5, a block diagram illustrating an example method 500 for transferring data with 2D barcodes according to one embodiment is shown. Process 500 may be performed by processing logic which may include software, hardware, or a combination thereof. For example, process 500 may be performed by device 300 of FIG. 3, which may correspond to receiver device 200 of FIG. 2. At block 510, images are captured by a second camera of the second device, wherein a view of the second camera covers the first display of the first device, and any 2D barcode contained in the images captured by the second camera is detected and decoded at the second device to recover the data encoded or embedded therein. At block 520, the one or more payload 2D barcodes are captured and decoded at the second device in sequence, one at a time, until all the one or more payload 2D barcodes have been decoded, wherein the second device generates and displays a corresponding ACK 2D barcode in response to decoding each of the one or more payload 2D barcodes in the images of the first display captured by the second camera. At block 530, a corresponding data package is stored at the second device upon decoding each of the one or more payload 2D barcodes. At block 540, the payload data is recovered at the second device based on the stored data packages.

In one embodiment, each of the payload 2D barcodes may comprise an indication of the total number of payload 2D barcodes in the transmission and an indication of a sequence number (ID) of the present payload 2D barcode. Accordingly, the receiver device may more readily determine that the payload 2D barcodes have been captured and decoded in the correct sequence, and determine when all the payload 2D barcodes have been captured and decoded.

In another embodiment, both devices may have substantial payload data that needs to be transmitted to the other device. When both devices display the respective first payload 2D barcode, i.e. want to be a "sender," a method for resolving the deadlock is required. The deadlock may be resolved manually by a user. For example, the user may manually place one of the devices into a receiver role to exit the deadlock and jumpstart the data transfer, e.g., through interaction with a conventional user interface, or through a motion input, a gesture input, or the like. In another embodiment, the deadlock may be resolved automatically. Both devices may detect the deadlock condition when they capture and decode a payload 2D barcode at the same time they are also displaying a payload 2D barcode. Accordingly, both devices may attempt to automatically resolve the deadlock by, individually, trying to place themselves into a receiver role after a random delay from the moment the deadlock is detected, while at the same time continuously determining whether the other device has entered a receiver role. Because the delay is random and is determined individually at the devices, there is a high probability that one device will convert into the receiver role before the other device. Upon entering the receiver role, the receiver device captures and decodes the payload 2D barcode displayed by the other device, and displays a corresponding ACK 2D barcode, as has been described in detail above. The ACK 2D barcode informs the other device of the presence of a receiver device, and thus the end of the deadlock. The other device then stops the process of placing itself into the receiver role, stays in the sender role instead, and proceeds to display the subsequent payload 2D barcodes to complete the data transfer, as has been described in detail above.

It should be appreciated that there is a small, but non-zero probability that the two devices may place themselves into the receiver role almost simultaneously while trying to automatically resolve the deadlock due to a combination of the random delays selected and/or the relevant processing latencies. Accordingly, a new deadlock where both devices are in the receiver role simultaneously may arise. Upon detecting this new deadlock, both devices may attempt to automatically resolve it in the same way as they tried to resolve the first deadlock, i.e., by individually trying to place themselves into a sender role after a random delay from the moment the deadlock is detected, while at the same time continuously determining whether the other device has entered a sender role. Upon entering the sender role, the sender device displays its first payload 2D barcode, as has been described in detail above. The payload 2D barcode informs the other device of the presence of a sender device, and thus the end of the deadlock. The other device then stops the process of trying to place itself into the sender role, stays in the receiver role instead, and continues displaying the ACK 2D barcode corresponding to the first payload 2D barcode of the sender device. The data transfer process then may proceed as usual as has been described in detail above.

It should be appreciated that due to the use of random delays, the deadlocks will not continue indefinitely, and will eventually be resolved. The random delays should be selected from a sufficiently wide range to reduce the probability of entering a new deadlock. In one embodiment, the random delays may be selected from the range spanning from 0.5 to 2 seconds.

In another embodiment, both devices start in the receiver role, resulting similarly in a deadlock. It should be appreciated that this deadlock can also be automatically resolved with the method described in detail above. That is, both devices may individually try to place themselves into a sender role after a random delay from the moment the deadlock is detected, while at the same time continuously determining whether the other device has entered a sender role. Subsequent operations are the same as have been described in detail above, and will not be repeated here.

It should be appreciated that in other embodiments, the devices may utilize other methods than the random delays-based approach described in detail above to negotiate with each other to reach an agreement about the roles of the devices based on the bidirectional communication capability.

In one embodiment, both devices simultaneously transmit substantial payload data to the other device in a full-duplex fashion. Therefore, the 2D barcodes displayed carry both an ACK for the 2D barcode displayed at the other device as well as payload data. Accordingly, both devices have equal roles and both simultaneously send and receive payload data. It should be appreciated that the amount of payload data sent by one device does not need to be equal to the amount of payload data sent by the other device: if the data transfer is completed in one direction first, the subsequent 2D barcodes displayed by the device having no further payload data to send carry only the ACKs.

Some commonly used 2D barcodes, including the QR code, are designed to carry printable characters. This is well suited when the payload data comprises printable characters only, such as when the payload data comprises JSON structures. The data capacity of a single 2D barcode is determined by the size/dimension of the 2D barcode, and in embodiments described herein, is limited by the resolution of the device displays and of the cameras. The dimension of the 2D barcodes used may be adapted per transmission, and may be selected based on the device displays and the cameras available. When more payload data than can be accommodated in a single 2D barcode needs to be transmitted, the payload data needs to be divided into smaller data packages each of which can be accommodated in a single 2D barcode.

In one embodiment, in addition to a payload data package, a payload 2D barcode may further comprise additional metadata. The metadata may include one or more of: 1) a size of the data package, 2) a sequence number of the data package, 3) a total quantity of packages in the instant data transfer, 4) a checksum, 5) a sender device identifier (ID), 6) a receiver device ID, or 7) a data transfer ID for the instant data transfer. Additional metadata may also be included. Where an ID is included, a universally unique identifier (UUID), or an identifier of any other suitable form, may be utilized.

In one embodiment, encryption and/or compression techniques may be applied to the data transfer. Any suitable encryption or compression method may be utilized. In one embodiment, only the payload data packages are encrypted and/or compressed. In another embodiment, all data comprised in the payload 2D barcode including the data package and the metadata is encrypted and/or compressed. Where the encryption and/or compression processes generate binary data that include other than printable characters, a binary-to-text encoding method such as Hexadecimal (Base16), Base58, or Base 64 may be utilized so that the encrypted and/or compressed data may be carried in a 2D barcode that supports only printable characters.

In one embodiment, encryption based on a pre-shared password or key may be applied. This may prevent eavesdropping, and may be especially useful when the data transfer takes place in a public place (e.g., when one of the two devices is an automatic teller machine "ATM"). The pre-shared password or key may be supplied by user(s) via the user interface prior to the data transfer (for example, when two users are involved, the password can be verbally agreed on by the user before it is entered by each user into the respective device through the user interface). Encryption may be useful in the prevention of injection of or interference from other 2D barcodes that are not generated as part of the bidirectional data transfer session, as a 2D barcode not encrypted in an expected way may be readily rejected. A hardcoded password or key not specifically known to the users may be used in the encryption for this purpose.

In one embodiment, a user confirmation at the receiver device is required before the received payload data is accepted for use. In another embodiment, a user confirmation at the receiver device is required before the receiver device starts to receive data. The user confirmation may be provided through interaction with a conventional user interface, or through a motion input, a gesture input, or the like.

In one embodiment, the counterpart device accepted for the data transfer may be limited based on a device identifier that is included in the 2D barcodes. For example, a receiver device may receive payload data only from sender devices whose device IDs are on an allowed list and reject data from any other sender devices. Similarly, a sender device may send payload data only to receiver devices whose device IDs are on an allowed list and refuse to send payload data to any other receiver devices. The device ID can be embedded in the 2D barcodes including the payload 2D barcodes and the ACK 2D barcodes.

In one embodiment, prior to the first payload 2D barcode is displayed, one or more additional initialization 2D barcodes may be displayed and communicated, either in one direction only or in both directions. The initialization 2D barcodes may comprise parameters such as a password, an encryption key, a purpose of the data transfer, etc. At least some of the parameters may be negotiated or exchanged between the two devices through the bidirectional exchange of one or more initialization 2D barcodes.

In one embodiment, special 2D barcodes may be utilized to communicate control information other than the ACK. For example, different special 2D barcodes may be utilized to convey one or more of: a device reset request, a transfer reset request, a transfer cessation indication, a transfer completion indication, or a transfer rejection indication, etc. For example, if a receiver device captures and detects an out-of-order payload 2D barcode (e.g., it detects a 2nd payload 2D barcode without receiving the 1st payload 2D barcode, or detects a 4th payload 2D barcode immediately after receiving the 2nd payload 2D barcode), the receiver device would understand that it may have jumped into an open transfer, or that other devices may be interfering with the transfer, and in such a case the receiver device may display a special 2D barcode to communicate a transfer reset request.

In one embodiment, prior to the detection of the counterpart device, a device displaying an initial 2D barcode (which can be, for example, a 1st payload 2D barcode, an initiation 2D barcode, etc.) may adjust the display of the initial 2D barcode to facilitate its detection by a potential counterpart device. Adjusting the display of the 2D barcode may comprise one or more of: 1) varying the location of display of the 2D barcode on the device display (e.g., from top to bottom, from bottom to top, or between any two locations on the display), 2) rotating the displayed 2D barcode by 90 degrees, 180 degrees, or 270 degrees, either clockwise or counter-clockwise, or 3) disappearing the 2D barcode from the display for a short time period and then resuming the display of the 2D barcode. The display adjustments may be performed at fixed intervals, or with a random rhythm, until a counterpart device is detected. In one embodiment, the time period between two adjustments can be selected from a range spanning from 0.5 to 1.5 seconds. It should be appreciated that such adjustments may facilitate the detection of the 2D barcode by a potential counterpart device due to the ways in which commonly found autofocus and 2D barcode detection algorithms work. Varying the location of display of the 2D barcode may also help when there is a minor misalignment in the "face to face" arrangement of the two devices.

It should be appreciated that various factors may affect data transfer rate that can be achieved based on the 2D barcode-based bidirectional data exchange techniques described herein. Such factors may include, for example, the hardware performance of the devices and the efficiency of camera control, 2D barcode generation, and 2D barcode detection and decoding algorithms. It should be appreciated that for better results, the 2D barcodes should be displayed on a white background with sufficient margins from the borders of the display to improve display contrast, such that the displayed 2D barcodes are easier to detect and decode.

In one embodiment, the techniques described herein may be adapted for a device that only has a camera and a display on opposite sides of the device (i.e., the device has no "front-facing" camera). In such a case, user intervention in the form of flipping the device over at proper times to enable, alternately, the capturing and showing of 2D barcodes is required. A suitable visual prompt may be displayed on the device display at proper times to prompt the user to turn the device around. In addition to or in lieu of the visual prompt, a sound or voice prompt may be played at proper times to prompt the user to turn the device around.

It should be appreciated that a temporary interruption to an ongoing data transfer described herein does not invalidate the transfer that has taken place up to the point of interruption, and the data transfer can be resumed from the point of interruption once the issue causing the interruption is resolved. For example, an interruption may result when the two devices are temporarily brought out of the face-to-face alignment (e.g., when a user wishes to take a look at the display for any reason), or when the two devices become too close to each other or too far apart. The data transfer can be resumed from the point of interruption once the devices are brought back into a proper arrangement relative to each other.

In one embodiment, the data transfer status information including progress information (e.g., "2 of 3 packages received") may be displayed on the device displays. User prompts, such as prompts to bring the devices back into alignment or to turn the device over, may also be displayed. In addition to or in lieu of the displayed information and prompts, sound prompts or voice prompts may be played.

In one embodiment, a device may detect that a potential counterpart device has appeared in its camera view, even though a 2D barcode has not been detected. The detection may be based on, for example, the general shape of mobile devices. When a device detects a potential counterpart device in its camera view, but cannot detect a 2D barcode, it may assume that the other device in the camera view has not been properly configured for performing the 2D barcode-based data transfer, or that the two devices are not in a proper physical arrangement. Accordingly, the device may display a notification prompting the user to configure the other device and bring the two devices into a proper arrangement for the data transfer. In addition to or in lieu of the visual notification, a sound prompt or a voice prompt may be utilized and played.

Therefore, embodiments of the disclosure relate to a method, apparatus, and system for exchanging data in a bidirectional fashion between two devices through the use of displayed 2D barcodes and device cameras that capture the displayed 2D barcodes. In some embodiments, the two devices may comprise a mainly sending device and a mainly receiving device. In other embodiments, both devices may send a substantial amount of payload data to and receive a substantial amount of payload data from the other device. The embodiments may be beneficial when establishing an electrical or radio connection, either directly or indirectly, is undesirable. For example, the user may be wary of the risk associated with establishing an electrical or radio connection; the establishment of an electrical or radio connection may be too time-consuming for the occasion; or the user may lack the knowledge and expertise required to establish an electrical or radio connection. As a further example of a reason that the establishment of an electrical or radio connection may be undesirable, the users of the two devices may prefer not to physically handle each other's devices, which may be required to establish an electrical or radio connection, for hygiene reasons.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for bidirectional data transfer based on barcodes, the method comprising:
   generating, at a first device, one or more payload barcodes, each payload barcode corresponding to one of one or more data packages of payload data and comprising data of the corresponding data package;
   capturing images by a first camera of the first device, wherein a view of the first camera covers a second display of a second device, and any barcode contained in the images captured by the first camera is detected and decoded at the first device;
   displaying, at a first display of the first device, in sequence, the one or more payload barcodes, one at a time, until all the one or more payload barcodes have been displayed; and
   stopping displaying a previous payload barcode and proceeds to display a subsequent payload barcode, in response to detection in the images of the second display captured by the first camera an acknowledgment (ACK) barcode corresponding to the previous payload barcode,
   wherein at least one of the one or more payload barcodes further comprises one or more of: a size of the corresponding data package, a checksum, a sender device identifier (ID), a receiver device ID, or a data transfer session ID,
   wherein the second device refuses to partake in the data transfer when the sender device ID does not match any device ID on an allowed sender list.

2. The method of claim 1, wherein the second device is configured to:
   capture images, using a second camera of the second device, wherein a view of the second camera covers the first display of the first device, and any barcode contained in the images captured by the second camera is detected and decoded at the second device;
   capture and decode, in sequence, the one or more payload barcodes, one at a time, until all the one or more payload barcodes have been decoded, wherein the second device generates and displays a corresponding ACK barcode in response to decoding each of the one or more payload barcodes in the images of the first display captured by the second camera;
store a corresponding data package upon decoding each of the one or more payload barcodes; and
recover the payload data based on the stored data packages.

3. The method of claim 2, wherein the payload barcodes and the ACK barcodes comprise Quick Response (QR) codes.

4. The method of claim 2, wherein each of the one or more payload barcodes comprises a payload barcode sequence number and a total quantity of the one or more payload barcodes.

5. A computer-implemented method for bidirectional data transfer based on barcodes, the method comprising:
generating, at a first device, one or more payload barcodes, each payload barcode corresponding to one of one or more data packages of payload data and comprising data of the corresponding data package;
capturing images by a first camera of the first device, wherein a view of the first camera covers a second display of a second device, and any barcode contained in the images captured by the first camera is detected and decoded at the first device;
displaying, at a first display of the first device, in sequence, the one or more payload barcodes, one at a time, until all the one or more payload barcodes have been displayed;
stopping displaying a previous payload barcode and proceeds to display a subsequent payload barcode, in response to detection in the images of the second display captured by the first camera an acknowledgment (ACK) barcode corresponding to the previous payload barcode; and
performing at the first device operating in a sending role deadlock resolution operations in response to detecting, while displaying a first of the one or more payload barcodes, that the second device is also in a sending role.

6. The method of claim 5, wherein the deadlock resolution operations comprise:
starting, at the first device, a countdown of a first random time period;
keeping the first device in the sending role and stopping the countdown when the first device detects that the second device has displayed an ACK barcode corresponding to the first of the one or more payload barcode before the countdown is finished; and
switching the first device into a receiving role when the countdown is finished.

7. The method of claim 2, wherein the corresponding data package comprised in each of the one or more payload barcodes is encrypted or compressed.

8. The method of claim 2, wherein all data comprised in each of the one or more payload barcodes is encrypted or compressed.

9. The method of claim 2, wherein prior to displaying a first of the one or more payload barcodes, the first device generates and displays an initiation barcode comprising one or more of: a password, an encryption key, or a data transfer purpose.

10. The method of claim 2, wherein prior to detecting, in images of the second display of the second device, an ACK barcode corresponding to the first of the one more payload barcodes, the first device adjusts display of the first of the one or more payload barcodes on the first display, the adjusting comprising one or more of:
adjusting a display location of the barcode on the first display,
rotating the displayed barcode by a predetermined degree in a predetermined direction, or
temporarily disappearing the barcode from display.

11. The method of claim 2, wherein the first device and the second device are separated by transparent solid material.

12. A non-transitory computer-readable medium having instructions stored therein, which when executed by a computer, cause the computer to perform operations of bidirectional data transferring based on barcodes, the operations comprising:
generating, at a first device, one or more payload barcodes, each payload barcode corresponding to one of one or more data packages of payload data and comprising data of the corresponding data package;
capturing images by a first camera of the first device, wherein a view of the first camera covers a second display of a second device, and any barcode contained in the images captured by the first camera is detected and decoded at the first device;
displaying, at a first display of the first device, in sequence, the one or more payload barcodes, one at a time, until all the one or more payload barcodes have been displayed; and
stopping displaying a previous payload barcode and proceeds to display a subsequent payload barcode, in response to detection in the images of the second display captured by the first camera an acknowledgment (ACK) barcode corresponding to the previous payload barcode,
wherein at least one of the one or more payload barcodes further comprises one or more of: a size of the corresponding data package, a checksum, a sender device identifier (ID), a receiver device ID, or a data transfer session ID,
wherein the second device refuses to partake in the data transfer when the sender device ID does not match any device ID on an allowed sender list.

13. The computer-readable medium of claim 12, wherein the second device is configured to:
capture images, using a second camera of the second device, wherein a view of the second camera covers the first display of the first device, and any barcode contained in the images captured by the second camera is detected and decoded at the second device;
capture and decode, in sequence, the one or more payload barcodes, one at a time, until all the one or more payload barcodes have been decoded, wherein the second device generates and displays a corresponding ACK barcode in response to decoding each of the one or more payload barcodes in the images of the first display captured by the second camera;
store a corresponding data package upon decoding each of the one or more payload barcodes; and
recover the payload data based on the stored data packages.

14. The computer-readable medium of claim 13, wherein the payload barcodes and the ACK barcodes comprise Quick Response (QR) codes.

15. The computer-readable medium of claim 13, wherein each of the one or more payload barcodes comprises a payload barcode sequence number and a total quantity of the one or more payload barcodes.

16. A non-transitory computer-readable medium having instructions stored therein, which when executed by a computer, cause the computer to perform operations of bidirectional data transferring based on barcodes, the operations comprising:

generating, at a first device, one or more payload barcodes, each payload barcode corresponding to one of one or more data packages of payload data and comprising data of the corresponding data package;

capturing images by a first camera of the first device, wherein a view of the first camera covers a second display of a second device, and any barcode contained in the images captured by the first camera is detected and decoded at the first device;

displaying, at a first display of the first device, in sequence, the one or more payload barcodes, one at a time, until all the one or more payload barcodes have been displayed;

stopping displaying a previous payload barcode and proceeds to display a subsequent payload barcode, in response to detection in the images of the second display captured by the first camera an acknowledgment (ACK) barcode corresponding to the previous payload barcode; and performing at the first device operating in a sending role deadlock resolution operations in response to detecting, while displaying a first of the one or more payload barcodes, that the second device is also in a sending role.

17. The computer-readable medium of claim 16, wherein the deadlock resolution operations comprise:

starting, at the first device, a countdown of a first random time period;

keeping the first device in the sending role and stopping the countdown when the first device detects that the second device has displayed an ACK barcode corresponding to the first of the one or more payload barcode before the countdown is finished; and switching the first device into a receiving role when the countdown is finished.

18. An electronic device operating as a first device, comprising:

a processor; and a memory coupled to the processor to store instructions, which when executed by the processor, cause the processor to perform operations of bidirectional data transferring based on barcodes, the operations including:

generating, at the first device, one or more payload barcodes, each payload barcode corresponding to one of one or more data packages of payload data and comprising data of the corresponding data package;

capturing images by a first camera of the first device, wherein a view of the first camera covers a second display of a second device, and any barcode contained in the images captured by the first camera is detected and decoded at the first device;

displaying, at a first display of the first device, in sequence, the one or more payload barcodes, one at a time, until all the one or more payload barcodes have been displayed; and stopping displaying a previous payload barcode and proceeds to display a subsequent payload barcode, in response to detection in the images of the second display captured by the first camera an acknowledgment (ACK) barcode corresponding to the previous payload barcode, wherein at least one of the one or more payload barcodes further comprises one or more of: a size of the corresponding data package, a checksum, a sender device identifier (ID), a receiver device ID, or a data transfer session ID, wherein the second device refuses to partake in the data transfer when the sender device ID does not match any device ID on an allowed sender list.

19. The device of claim 18, wherein the second device is configured to:

capture images, using a second camera of the second device, wherein a view of the second camera covers the first display of the first device, and any barcode contained in the images captured by the second camera is detected and decoded at the second device;

capture and decode, in sequence, the one or more payload barcodes, one at a time, until all the one or more payload barcodes have been decoded, wherein the second device generates and displays a corresponding ACK barcode in response to decoding each of the one or more payload barcodes in the images of the first display captured by the second camera;

store a corresponding data package upon decoding each of the one or more payload barcodes; and recover the payload data based on the stored data packages.

20. The device of claim 19, wherein the payload barcodes and the ACK barcodes comprise Quick Response (QR) codes.

* * * * *